(12) United States Patent
Bojovschi et al.

(10) Patent No.: US 10,671,097 B2
(45) Date of Patent: Jun. 2, 2020

(54) IMAGE PROCESSING FOR IMPROVING COAGULATION AND FLOCCULATION

(71) Applicant: International Business Machines Corporation, Armonk, NY (US)

(72) Inventors: Alexe Bojovschi, Melbourne (AU); Rajib Chakravorty, Melbourne (AU); Sridhar Kannam, Melbourne (AU); Xi Liang, Altona Meadows (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/372,548

(22) Filed: Apr. 2, 2019

(65) Prior Publication Data

US 2019/0227578 A1     Jul. 25, 2019

Related U.S. Application Data

(63) Continuation of application No. 14/953,687, filed on Nov. 30, 2015, now Pat. No. 10,372,144.

(51) Int. Cl.
*C02F 1/24* (2006.01)
*G05D 7/06* (2006.01)
(Continued)

(52) U.S. Cl.
CPC ............ *G05D 7/0629* (2013.01); *C02F 1/24* (2013.01); *C02F 1/5209* (2013.01); *C02F 1/547* (2013.01);
(Continued)

(58) Field of Classification Search
CPC .................................................. C02F 7/0629
See application file for complete search history.

(56) References Cited

U.S. PATENT DOCUMENTS 3,138,550 A     6/1964   Woolery
3,393,780 A     7/1968   Kilness
(Continued)

FOREIGN PATENT DOCUMENTS

CN     1538177 A     10/2004
CN     1300010 C      3/2005
(Continued)

OTHER PUBLICATIONS

Achanta et al. "SLIC Superpixels Compared to State-of-the-Art Superpixel Methods" IEEE Transactions on Pattern Analysis and Machine Intelligence, vol. 34, No. 11, Nov. 2012.
(Continued)

*Primary Examiner* — Peter Keyworth
(74) *Attorney, Agent, or Firm* — Harrington & Smith

(57) ABSTRACT

A flocculation control system that floats particles that attach to nano and/or micro bubbles out of a liquid includes at least one sensing system, at least one processing system, and at least one fluid additive control system. The at least one sensing system is configured to reproduce one or more nano-bubbles with one or more particles suspended in a fluid. The at least one processing system is configured to measure, using outputs of the at least one sensing system, incident angles between the one or more nano-bubbles and the one or more particles suspended in the fluid. And the at least one fluid additive control system is configured to adjust, based on at least the incident angles, an amount of a surfactant being added to the fluid.

9 Claims, 4 Drawing Sheets

(51) Int. Cl.
*C02F 1/52* (2006.01)
*C02F 1/54* (2006.01)

(52) U.S. Cl.
CPC .... *C02F 2209/006* (2013.01); *C02F 2303/26* (2013.01); *C02F 2305/04* (2013.01)

(56) References Cited

U.S. PATENT DOCUMENTS

| | | | |
|---|---|---|---|
| 3,976,269 | A | 8/1976 | Gupta |
| 4,308,149 | A | 12/1981 | Selvarajan |
| 4,654,139 | A | 3/1987 | Baba et al. |
| 4,738,750 | A | 4/1988 | Ackel |
| 4,904,373 | A | 2/1990 | Miller et al. |
| 4,981,582 | A | 1/1991 | Yoon et al. |
| 5,006,231 | A | 4/1991 | Oblad et al. |
| 5,068,031 | A | 11/1991 | Wang et al. |
| 5,096,572 | A | 3/1992 | Hwang |
| 5,397,001 | A | 3/1995 | Yoon et al. |
| 5,814,210 | A | 9/1998 | Yoon et al. |
| 6,234,318 | B1 | 5/2001 | Breau et al. |
| 6,778,881 | B1 | 8/2004 | Du Plessis et al. |
| 7,591,452 | B2 | 9/2009 | Kohama et al. |
| 9,652,841 | B2 | 5/2017 | Bojovschi et al. |
| 2007/0189972 | A1 | 8/2007 | Chiba et al. |
| 2011/0300078 | A1 | 12/2011 | Borden et al. |
| 2014/0225416 | A1 | 8/2014 | Harding et al. |

FOREIGN PATENT DOCUMENTS

| | | |
|---|---|---|
| CN | 101362118 A | 2/2009 |
| CN | 201371078 Y | 12/2009 |
| CN | 101673042 A | 3/2010 |
| CN | 202129149 U | 2/2012 |
| CN | 202421023 U | 9/2012 |
| CN | 102564910 B | 6/2013 |
| CN | 104199389 A | 12/2014 |
| CN | 204536926 U | 8/2015 |
| WO | 97/45203 | 12/1997 |
| WO | 2014188232 A1 | 11/2014 |

OTHER PUBLICATIONS

Sayed Ahmed, Ahmed S.,"Cavitation Nanobubble Enhanced Flotation Process for More Efficient Coal Recovery" (2013). Theses and Dissertations—Mining Engineering. Paper 8. http://uknowledge.uky.edu/mng_etds/8.

M.A.D. Azevedo, J. Drelich and J.D. Miller "The Effect of pH on Pulping and Flotation of Mixed Office Wastepaper" Journal of Pulp and Paper Science: vol. 25 No. 9 Sep. 1999.

John K. Borchardt "The Use of Surfactants in De-inking Paper for Paper Recycling" Shell Chemical Company, PO Box 1380, Houston, TX 77251-1380, USA Current Opinion in Colloid & Interface Science (Impact Factor: 5.84). Aug. 1997; 2 (4); 402-408. DOI: 10.1016/S1359-0294(97)80084-2.

R. Clift "Bubbles, Drops, and Particles" Academic Press 1978.

Jaroslaw Drelich and Jan D. Miller "Improved Flotation Deinking of Sorted Office Papers by Flocculation of Ink Particles" Progress in Paper Recycling Nov. 2001.

Hampton et al. "Nanobubbles and the Nanobubble Bridging Capillary Force" Adv Colloid Interface Sci. Feb. 26, 2010; 154 (1-2): 30-55. doi 10.1016/j.cis.2010.01.006.Epub Jan. 22, 2010.

Karpitschka, Stefan "Nonintrusive Optical Visualization of Surface Nanobubbles" (www.altmetric.com/details.php?domain=journals.aps.org&citation_id=916870).

Kass, Michael et al. "Snakes: Active Contour Models" International Journal of Computer Vision, 321-331 (1988).

Otsu, Nobuyuki, "A Threshold Selection Method from Gray-Level Histograms" IEEE Transactions on Systems, Man, and Cybernetics, vol. SMC-9, No. 1, Jan. 1979.

Poynor, Adele "How Water Meets a Hydrophobic Surface" Physical Review Letters. PRL 97, 266101 (2006).

Samet, Hanan "Efficient Component Labeling of Images of Arbitrary Dimension Represented by Linear Bintrees" IEEE Transactions on Pattern Analysis and Machine Intelligence, vol. 10 No. 4, Jul. 1988.

Soni, Gaurav "Development and Validation of a Simulator Based on a First-Principle Flotation Model" Jun. 27, 2013.

Steitz, Roland et al. "Nanobubbles and Their Precursor Layer at the Interface of Water Against a Hydrophobic Substrate" vol. 19 No. 6, 2013.

Wang, Yuliang et al. "Boundary Slip and Nanobubble Study in Micro/Nanofluidics Using Atomic Force Microscopy" Soft Matter Issue 1. 2010.

Zhang "A Nanoscale Gas State" Phys Rev Lett. Mar. 30, 2007; 98(13): 136101. Epub Mar. 26, 2007.

"Interaction of Ionic Species and Fine Solids with a Low Energy Hydrophobic Surface from Contact Angle Measurement" Journal of Colloid and Interface Science; vol. 204, Issue 2, Aug. 15, 1998. pp. 342-349.

List of IBM Patents or Patent Applications Treated as Related, Apr. 2, 2019, 2 pgs.

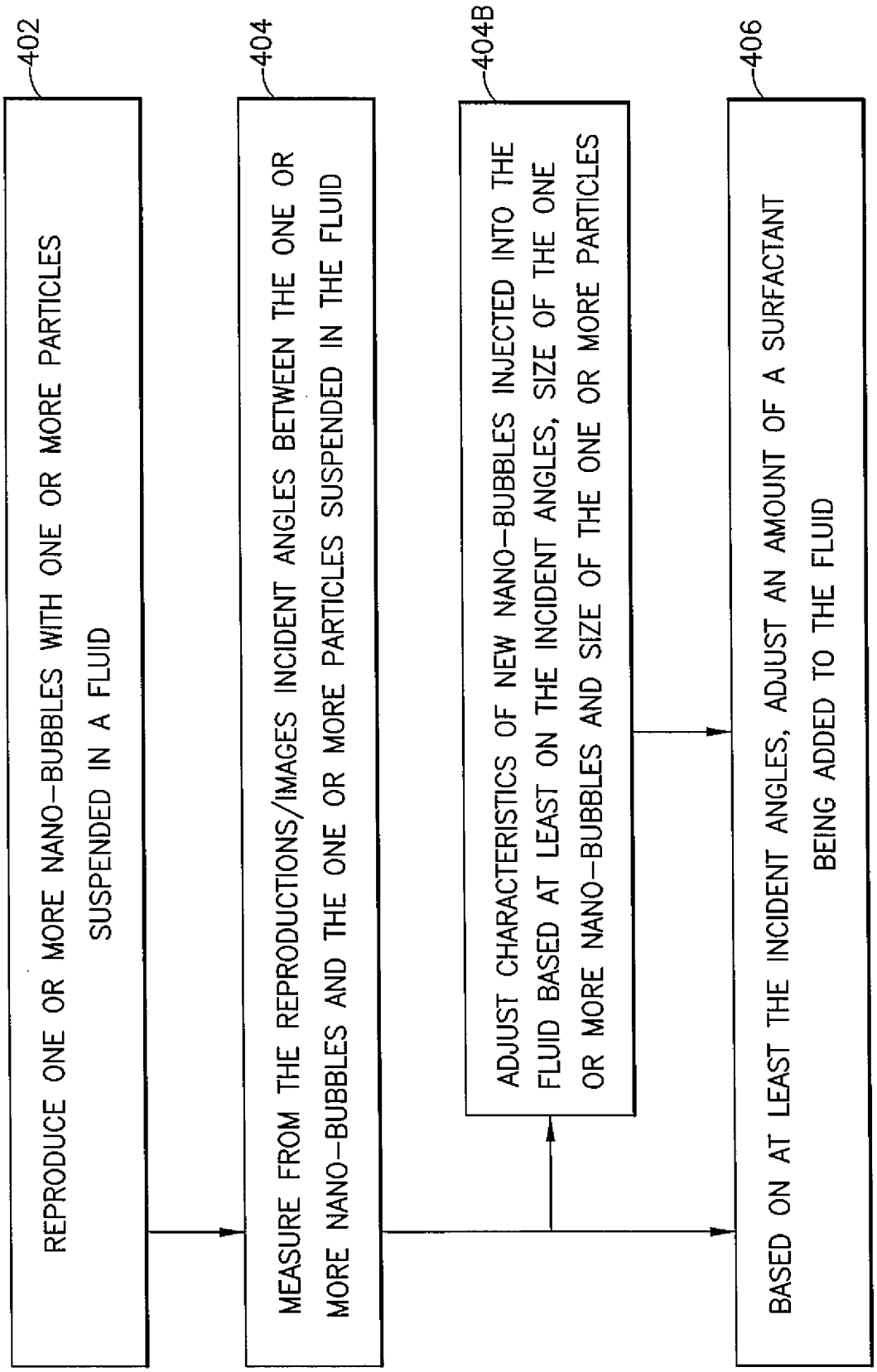

IMAGE PROCESSING FOR IMPROVING COAGULATION AND FLOCCULATION

CROSS-REFERENCE TO RELATED APPLICATIONS

This application is a divisional application of U.S. patent Ser. No. 14/953,687, filed on Nov. 30, 2015, the disclosure of which is hereby incorporated by reference in its entirety.

TECHNICAL FIELD

The exemplary embodiments of this invention relate generally to characterizing and visualizing nano and/or micro bubbles as may be used in a particle recovery process which floats particles that attach to such bubbles out of a liquid, where this characterizing and visualizing is computer-driven and includes image processing.

BACKGROUND

Co-owned U.S. patent application Ser. No. 14/797,348, filed on Jul. 13, 2015, details certain techniques for characterizing bubble sizes as well as contact angles between bubbles and particles in real-time from images taken within a froth flotation system, and that application is fully incorporated herein by reference.

It is known to induce bubbling into a solution so as to float particles to the surface for recovery or recycling of such particles. The particles may be valuable to be recovered for example where the solution is mining effluent, or they may be pollutants to be disposed of for example where the solution is an industrial waste stream from a recycled paper re-processing facility. FIG. 1, taken from the above-referenced co-owned US patent application, illustrates the froth flotation principle for the specific case of hydrophobic particles. These hydrophobic particles 200 come in contact with and adhere to bubbles 100 and rise with them to the surface to form a froth in which the particles can be easily skimmed from the solution 300, while hydrophilic particles remain as waste within the solution. FIG. 1 specifically shows nano-bubbles 100 which have been shown to increase efficiency of the flotation process. Various reactants and surfactants can be added to the solution to bias the bubbles' attachment towards or away from a given type of particle.

Froth flotation as well as flocculation are both conventional beneficiation processes for recovering valuable particles or contaminants. Particles such as ink or mineral present in the pulp typically have a very broad size distribution. For example, the size of ink particles have been reported to range from about 10 microns to 600 microns.

Fine particles with a diameter of less than 30 microns are documented to be particularly resistant to flotation. For this reason sometimes a coagulation or flocculation process is initiated in the pulp before flotation processes are used to separate the coagulated/flocculated particles. These methods typically use coagulants, flocculation and nano-bubbles to attach particles of sizes smaller than a few microns to each other to form a floc.

Numerous investigations have been performed on fine particles such as mineral, coal, ink and contaminants, reporting various physical and chemical separation techniques:

U.S. Pat. Nos. 5,068,031; 3,393,780; and 4,308,149 describe polymer flocculation.

Koh, P. T. L., and Warren, L. J., [*Trans. Inst. Min. Metall.*, 86, C94-95; 1977] and also Song, S., and Trass, O., [*Fuel*, 76, 839-844, 1997] describe hydrophobic flocculation.

Van Kleef, R. P. A. R., Myron, H. W., Wyder, P., and Parker M. R., [*IEEE Trans. On Magn. Mag*-20, 1168-1170, 1984] describe magnetic flocculation.

U.S. Pat. No. 3,976,269 discusses polymeric flocculation that include micro-bubbles in the floc.

Zabel, T. F. [INNOVATIONS IN FLOTATION TECHNOLOGY, P. Mavros and K. A. Matis (eds), Kluwer Academic Publishers, p. 431-454, 1992] discusses micro-bubble flotation.

Iannicelli, J. [BENEFICIATION OF MINERAL FINES, P. Somasundaran and N. Arbiter (eds.), AIME, Inc., p. 363-380, 1979] and Wasmuth, H. D., and Unkelbach, K. H. [Minerals Engineering, 4, 825, 1991] respectively discuss high-gradient magnetic separation and super-conducting separation.

Meadus, F. W. [The Canadian Mining and Metallurgical Bulletin, 61, 736, 1968] describes the development of oil spherical agglomeration for fine coal cleaning.

U.S. Pat. No. 4,654,139 describes computer vision taking a plurality of images of the flocs in a basin.

U.S. Pat. No. 5,006,231 describes using optoelectric detectors with light emitting diodes to measure the solids concentration in the slurry so as to optimize the coagulations of materials.

What is needed in the art is a way to control the system for forming flocs.

SUMMARY

In a first aspect thereof the embodiments of this invention provide a flocculation control system comprising at least one sensing system, at least one processing system, and at least one fluid additive control system. The at least one sensing system is configured to reproduce one or more nano-bubbles with one or more particles suspended in a fluid. The at least one processing system is configured to measure, using outputs of the at least one sensing system, incident angles between the one or more nano-bubbles and the one or more particles suspended in the fluid. And the at least one fluid additive control system is configured to adjust, based on at least the incident angles, an amount of a surfactant being added to the fluid.

In yet another aspect thereof the embodiments of this invention provide a computer readable memory having tangibly stored therewith program code. The program code is executable by a computing system for controlling a flocculation system by causing the computing system to perform actions that include at least: from reproductions of one or more nano-bubbles with one or more particles suspended in a fluid, measure incident angles between the one or more nano-bubbles and the one or more particles suspended in the fluid; and based on at least the incident angles, adjust an amount of a surfactant being added to the fluid.

In another aspect thereof the embodiments of this invention provide a method for controlling a flocculation system comprising: from reproductions of one or more nano-bubbles with one or more particles suspended in a fluid, measuring incident angles between the one or more nano-bubbles and the one or more particles suspended in the fluid; and based on at least the incident angles, adjusting an amount of a surfactant being added to the fluid.

BRIEF DESCRIPTION OF THE DRAWINGS

FIG. 4 is a logic flow diagram illustrating a method that encompasses certain features of the embodiments of this invention.

DETAILED DESCRIPTION

Figure 1:
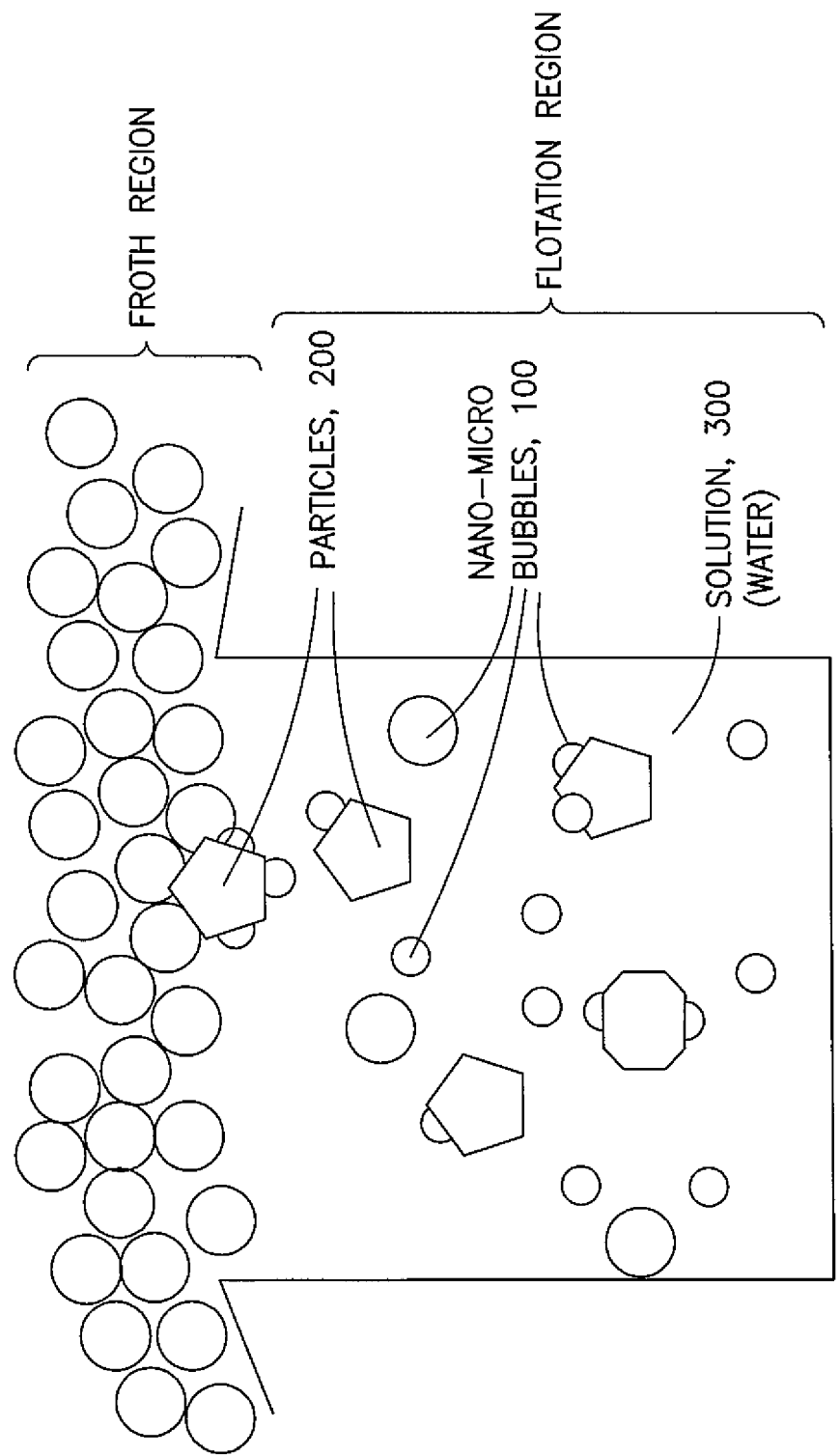
FIG. 1 is a sectional view of a flocculation/flotation cell of a flocculation/froth flotation system showing bubbles and particles attached to some of the bubbles.

Consider the illustration of FIG. 1 to be a flotation tank or cell in a formal froth flotation process. Nano-bubbles 100 attach to particles 200 and float them into the froth region atop the liquid solution/fluid 300, either of their own buoyancy or by facilitating a stronger bond between the particles 200 and a larger micro-bubble. As mentioned above, certain industrial waste stream such as from coal mining or paper pulp processing have ultra-fine particles within the world or particles that are to be separated via flotation and recycled (in the case of valuable minerals) or disposed of (in the case of pollutants).

Generally one can consider about 30 microns as the maximum particle diameter for which flotation will be efficient for separation from the fluid. These ultra-fine particles can be efficiently separated via flotation if they are flocculated first. In this case the cell of FIG. 1 would be considered a flocculation cell and there would be flocs or aggregations of these ultra-fine particles that in the ideal would be bound to one another via nano-bubbles. Typically where there is a broad range of particulate sizes to remove flocculation and flotation occur in the same cell, and different size bubbles more readily attach to different size particles; in this regard a flocculation cell is a particular type of flotation cell. Embodiments of these teachings provide a system and method for controlling and enhancing the attachment of such ultra-fine particles in a flocculation cell. The specific examples below utilize optical imaging, computer vision and various controlled methods using feedback from the computer vision analysis of the flocculation cell imaging to optimize the attachment of fine particles via nano-bubbles.

The recovery of ultra-fine particles such as minerals and coals has recently attracted increasing attention, driven by a decrease in mineral resources and ore grades. The mining industry increasingly needs to use very finely grinded ores to liberate valuable minerals before any beneficiation can commence. Furthermore it has been recognized that older processes resulted in large quantities of valuable minerals being discarded due to slimes, which are generated in grinding circuits or in raw ores because of natural oxidization processes. Moreover there is an increasing need for ultra-pure minerals and coals which require the removal of impurities that are often finely inter-grown with the valuable substances. The removal of harmful compounds from concentrates is also required due to environmental concerns, and in relevant materials these compounds are finely dispersed in the concentrate. For example, it has become increasingly important to remove sulfur from coal prior to burning. Accurate, automated and economic methods for fine particle processing are needed.

Hydrophobic flocculation is a term used to describe the hydrophobic particles aggregation in aqueous suspension due to hydrophobic interaction between particles and the kinetic energy of sufficient magnitude. It is characterized by its high selectivity, namely that it can be specific to one matter in a mixture system, leaving other matters in dispersion. Emulsion flotation uses surfactants to induce the aggregation of valuable minerals, while a strong mechanical stirring is applied to mineral slurry. Over the years separation methods based on hydrophobic flocculation has advanced due to theories of hydrophobic interaction and hydrophobic flocculation. This method has been applied to remove organic contaminants in drinking water, processing of waste water, separation of microorganisms and cells in medical science, de-inking and fine mineral and coal processing.

Figure 2:
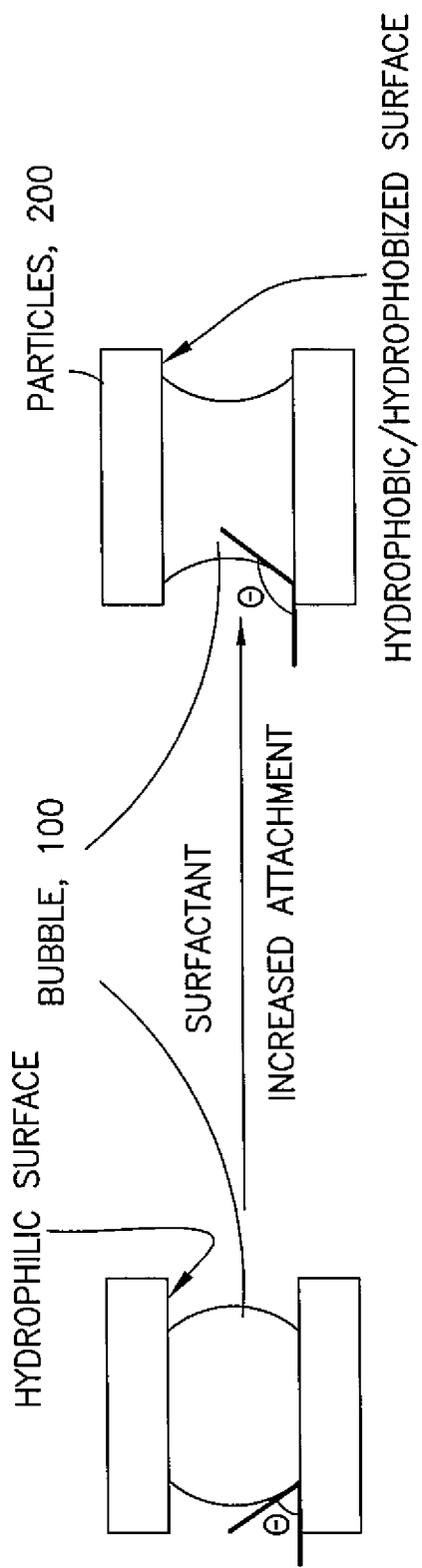
FIG. 2 illustrates two flocs that may form in the flocculation cell of FIG. 1, each having two particles attached to one nano-bubble and showing representative contact angles for hydrophilic (left) versus hydrophobic (right) particle surfaces.

Embodiments of these teachings provides for a system and method to optimize the attachment of fine particles via nano-bubbles and form flocs that can be subsequently floated using conventional flotation methods or collected using separation methods. FIG. 2 illustrates a minimal floc having two particles 200 attached to one another by a single nano-bubble 100. At the left of FIG. 2 the nano-bubble 100 is in contact with hydrophilic surfaces of the particles 200 and the angle between the surface of the particle 200 and the tangent of the surface of the nano-bubble 100 is acute. This angle characterizes the strength of the surface tension bond between the particle surface and the nano-bubble; sharper angles indicate a weaker bond that is more easily broken as the fluid flows and churns while larger angles indicate a tighter bond for which the floc is more likely to rise fully to the froth zone for skimming and removal. The right side of FIG. 2 shows a similarly minimal floc but with hydrophobic surfaces of the particles 200 in contact with the nano—bubble 100. Such particles can be hydrophobized by addition of a surfactant to the fluid carrying the particles, and specific surfactants to do so are known in the flocculation/flotation arts. The angles between the hydrophobized particles 200 and the nano-bubble 100 is obtuse and the tension bond between them is therefore stronger.

Information about the existing relationships between particles and nano-bubbles in a floc can be fed back into control apparatus for the flocculation cell in order to optimize the system for flocculation and the resulting flotation. Flocs can grow to various sizes and FIG. 2 demonstrates the smallest possible floc with a nano-bubble 100. It is possible to have two or more particles bond via the surfactant itself with no nano-bubble between them, but such a floc would not rise to be skimmed from the froth zone or if it did due to a large mis-match in specific densities of the surfactant relative to that of the remaining fluid the flotation would be largely inefficient. It is therefore desirable to limit the concentration of surfactant within the fluid so that flocs of particles 200 are predominantly formed with nano-bubbles 100.

This information about the particle-nano-bubble relationship in the flocs can be obtained visually via an optical sensing system, though also other sensing mechanisms can be used to observe the flocs in the cell. The above-referenced and co-owned U.S. patent application Ser. No. 14/797,348 details how optical images may be captured and processed to characterize nano-bubbles and particles and the angles between them. Similar techniques can be used to characterize flocs of particles and the various angles between particles and nano-bubbles. In a practical flocculation cell there are likely to be flocs of various sizes, and some sensing means such as an optical system may not be able to probe the interior of larger flocs. This is not a problem because the particles and nano-bubbles at the interior of a large floc are reasonably assumed to be tightly bound and not soon to separate from one another; the particles along the exterior of those larger flocs are the ones more likely to have a marginal attachment and those are the ones the optical or other sensing system can capture and characterize. For example, if a large floc has marginally attached particles along its perimeter, they are more likely to separate which makes formerly interior particles now on the perimeter. If the profile of surfactant type and concentration, and nano-bubble size and concentration in the fluid is not controlled for efficient flocculation and flotation these other particles will become only marginally attached and may also fall off the floc. The same cause of the original perimeter particles being weakly attached will continue seriatim to diminish the floc size so long as the surfactant and nano-bubble profile is not adjusted. So it is sufficient for the optical or other sensing apparatus to capture only the exterior surfaces of the overall floc.

In addition to the camera/image processing or other sensing system, a control for a flocculation system according to certain embodiments of these teachings also includes a computer vision system that characterizes, from the images or other types of reproductions of the flocs, the nano-bubble or bubbles located at the interface between the particles. FIG. 2 shows this interface at the designated angles e. For an optical image processing system the reproductions of the flocs that the computer vision system uses to characterize them are digital images, but other sensing systems may be used to capture/create electronic reproductions of the flocs, including for example neutron reflectometry, X-ray reflectivity measurements, optical spectroscopy, optical microscopy, and tapping mode atomic force microscopy.

The computer vision system characterizes the flocs, and specifically the relationship between the particles and the nano-bubbles that attach them, and in certain embodiments provide a visual output to the flocculation cell operators to show images such as those of FIG. 2 representative of an average or mean floc within the fluid on a graphical display screen and how those average/median floc characteristics would change with changes to the surfactant or nano-bubble profiles. Such profiles include the amount and/or type of surfactant being added to the fluid, and the rate of nano-bubble injection and size of the nano-bubbles being injected into the fluid. Alternatively the computer vision system can display tabular data detailing quantitatively how such changes would affect flocculation throughout the fluid as well as flotation, For example, the computer vision system can quantize the average/median floc size, tightness of bonds between floc particles and nano-bubble(s) (or more directly the incident angles of the flocs), density of flocs within the fluid, flotation rate of the average/median flocs as well as the smallest and largest flocs, and the like. The data accumulated from the images or other floc representations preferably captures sample flocs throughout the fluid or captures sample flocs at a representative location within the flocculation cell where mixing is especially thorough; and so in this regard what the computer vision system characterizes will be an estimation of the floc profile throughout the fluid.

In more general terms the computer vision system can be a processing system that may or may not provide a visual output to the flocculation cell operator. In one embodiment the processing system automatically provides command outputs to a fluid additive control system and thereby controls adjustments to the surfactant profile being added to the fluid and/or to the nano-bubble profile being injected into the fluid so as to optimize flocculation for flotation purposes. The amount and/or type of surfactant can be chosen so as to increase the contact angle θ and consequently strengthen the particle-to-particle interaction via the nano-bubble. Furthermore, since it is, the nano-bubbles that have the ability to enhance that particle-to-particle interaction through what is known in the art as the capillary gas bridge, the processing system's control over the profile of the nano-bubbles being injected into the fluid can more precisely optimize the flocculation and flotation as compared to controlling the surfactant profile alone. Specifically, the processing system will evaluate the characterized flocs and if there is more than a negligible amount of particle-to-particle interactions (flocs) in which there is no nano-bubble between particle pairs this indicates the bond between those particles is due to the surfactant (which was the traditional flocculation technique), and one way to minimize this less-than-optimal condition is to adjust the amount (or size) of nano-bubbles being injected into the fluid to ensure that particles are bridged by nano-bubbles.

Accurate characterization and visualization of these bubbles and specifics of the particles' attachment thereto enables more effective adjustments towards optimizing such particle flocculation and flotation processes. As an initial matter for this characterization and visualization, first an image or other electronic reproduction of the bubbles in the fluid is taken; above are described a variety of known techniques for capturing/creating such reproductions. Co-owned U.S. patent application Ser. No. 14/797,348 details how to extract from these reproductions the characterization of nano-bubbles and the various incident angles in an ongoing real time process of image capture and bubble characterization which in these teachings is extended to floc characterization. Specifically, first the images of the bubbles in fluid suspension are separated into at least three parts: air (gas or bubbles), liquid and solid. Bubbles that are enclosed within liquid and in contact with a solid surface such as a layer of particulates that are settled along the bottom of the cell/chamber are also considered when separating the image into the gas, liquid and solid parts. It is convenient to first separate liquid from solid, which can then be considered as connected components for a simpler segmentation from the image. Generally the nano/micro-bubbles and flocs within the liquid are separated from each other, so these can be separated from the liquid after the liquid is segmented from the solid.

Various segmentation methods can be applied to separate the air bubbles, liquid and solid components, for example by assuming reasonably that in relative magnitude of intensity air would be the least intense, solid would be the most intense and liquid would lie between those two. From these relative intensities individual pixels can be allocated as air, liquid or solid.

Another example assumes that air, liquid and solid are connected components. In this case for the correctly oriented image air is located at the top (e.g., the froth region at FIG. 1), solid is located at the bottom and liquid is located in between. The components can be separated using an active contour method or via region growing using seeds that are located on the top, middle and bottom of the image.

In the solution, segmented flocs or even individual nano/micro-bubbles can be assigned a unique identifier using connected component labeling to identify all isolated regions. Using this labeling technique for the relevant images of bubbles in the suspension, each isolated region of the image would be a bubble, and according to these teachings each isolated region would then be assigned with a unique ID. For each bubble and possibly also for each floc, the volume or size is computed. As one non-limiting example, the volume can be computed by multiplying the total number of pixels in the bubble or floc with the pixel size (e.g., total pixel number*pixel size=bubble or floc volume).

The distribution of the bubbles and flocs can be plotted based on these computed volumes and sizes. The size of the nano-bubble is important for enhancing flocculation and flotation of the desired particles because bubbles of different sizes have different functionality (e.g., bubble size relates to the size/mass of particles it can effectively attach to and flocculate and/or float). The bubble size is also an important indicator of the nano/micro bubble stability. In certain embodiments of these teachings the processing software classifies the bubbles in a given image into one of three possible types: bulk nano/micro-bubbles, surface nano/micro-bubbles and nano-pancakes. The bubbles in solution and the bubbles attached on the surface are classified. Based on the segmentation of the bubble types (bulk, surface and pancake), the size distribution of the bubbles in each category/type can be computed.

In a preferred embodiment the contact angles are determined from interpolating images taken from multiple angles (two or three angles for example). A given contact angle is estimated from individual images showing the contact angles in two dimensions. Repeating this for multiple images from multiple angles, and then interpolating from them, enables one to construct a better visualization of contact angles about the entire bubble/particle interface.

One purpose of this image processing is to enable one to compute geometrical parameters and the contact angle of nano/micro bubbles that are attached to the particles in a floc within the fluid. In pre-processing the image may be converted to a gray-value image and re-sampled to 1/10 of the original size in both x and y Cartesian directions to reduce the computational cost. A conventional region-grow method may be employed using for example five 'seed' points, one center point and four points located at the bubble edges above, below, on the right and on the left of the center. The bubble is assumed to be located approximately at the center of the image. The region, with 5 initial seed points, is iteratively grown by first comparing all unallocated neighboring pixels and then selectively including relevant pixels to the current region. The difference between the intensity of the pixels and the mean value of the region is used as a measure of contrast. The pixel with the smallest difference is allocated to the bubble. The process terminates when the intensity difference between the region mean and new pixel becomes larger than a certain threshold. A morphological closing is then applied on the generated bubble mask to fill all holes and smooth the boundary. The contour of the bubble segmentation is obtained and a bounding box of the bubble defined by the contour may be computed as the minimum rectangle enclosing the bubble. Next the bubble centroid is computed, equatorial and polar lines are drawn through that centroid so as to intersect in the center of the bubble which are used to compute the axial parameters.

With the nano-bubble now mathematically characterized the contact angles can be calculated. In one non-limiting technique first a line is constructed parallel to the particle surface which approximates a tangent line to the nano-bubble, then another line is drawn parallel to the equatorial axis to connect the opposing left and right boundary points of the nano-bubble.

The contact angle algorithm extracts the leftmost and rightmost points that are located both on that another line and on the bubble. Two curve intervals are then determined on the boundary/contour of the bubble. Curve intervals are drawn from the lowermost bubble boundary point to the right and left boundary points and multiple points on each these curves are connected to form multiple line segments. The smallest angle between the line segments and the horizontal is defined as the contact angle on that side. The contact angles between the nano-bubbles and the particle surfaces can be accurately estimated by averaging 4 angles from three orthogonal planes of density profiles that are perpendicular to the x and y axis respectively.

Another way to perform the image processing is to partition the image into three parts as mentioned above: a) solution/water, b) particles and c) bubbles. After that, attributes of the nano-bubbles and particles and the interaction of the two are characterized. In one implementation the images are divided into tiles; the size and number of tiles can vary and different tiles can overlap. By combining all tiles, it can recover the whole image. Each tile is further partitioned into many regions, called super-pixels. There are many known techniques for generating such super-pixels, such as watershed based, graph-cut based, normal-cut, simple linear iterative clustering (SLIC), or a combination of these. The size of the super-pixel may be determined by the minimum size of particle and nano-bubbles that are considered to be important.

Next a two-level threshold (A, B) is applied to partition these super pixels to three groups, by using any of the various known thresholding methods. These groups are distinguished by intensity values as noted above; groups that have an image intensity value great than A are labeled as solution/water, between A and B are labeled as particles and less than B are labeled as a bubble. The sequence of the intensity of different groups can vary, depending on the type of solutions, bubbles and particle. This results in an initial segmentation of solutions/bubbles/particles, which can be mapped such that the value suggests the type of pixel (e.g., 1 means solution pixel, 2 means bubble pixels etc.). This map can also have continuous values, where the value suggests the possibility of a given pixel being solution, bubble or particle.

Finally the segmentation results are refined for example using an active contour method 9 several are known) and using the initial map/mask as seed points/regions. This results in a more accurate segmentation of the solution, bubbles and particles. After this segmentation of particles/bubble/solutions, the following features may be computed to characterize all bubbles and then all particles, and possibly also all flocs:
  The average size
  The shape
  The size distribution
  The location distribution
  The ratio of bubbles/particles in the solution
  Other statistics, such as medium size, maximum size, etc.
  The following attributes may also be computed to characterize the interaction between particles and bubbles:
  Average attached area between all bubbles and particles
  For each particle, all attached bubbles and their contact angle with the particle.
  For each bubble, identify all attached particles and their contact angle with all particles.
  Various statistics can be computed to characterize the interaction between nano-bubbles and particles that form a floc, such as the average bubble size, average contact angles etc. All these measurements can be carried out in real-time in order to evaluate the dynamic of the flocculation environment.

Figure 3:
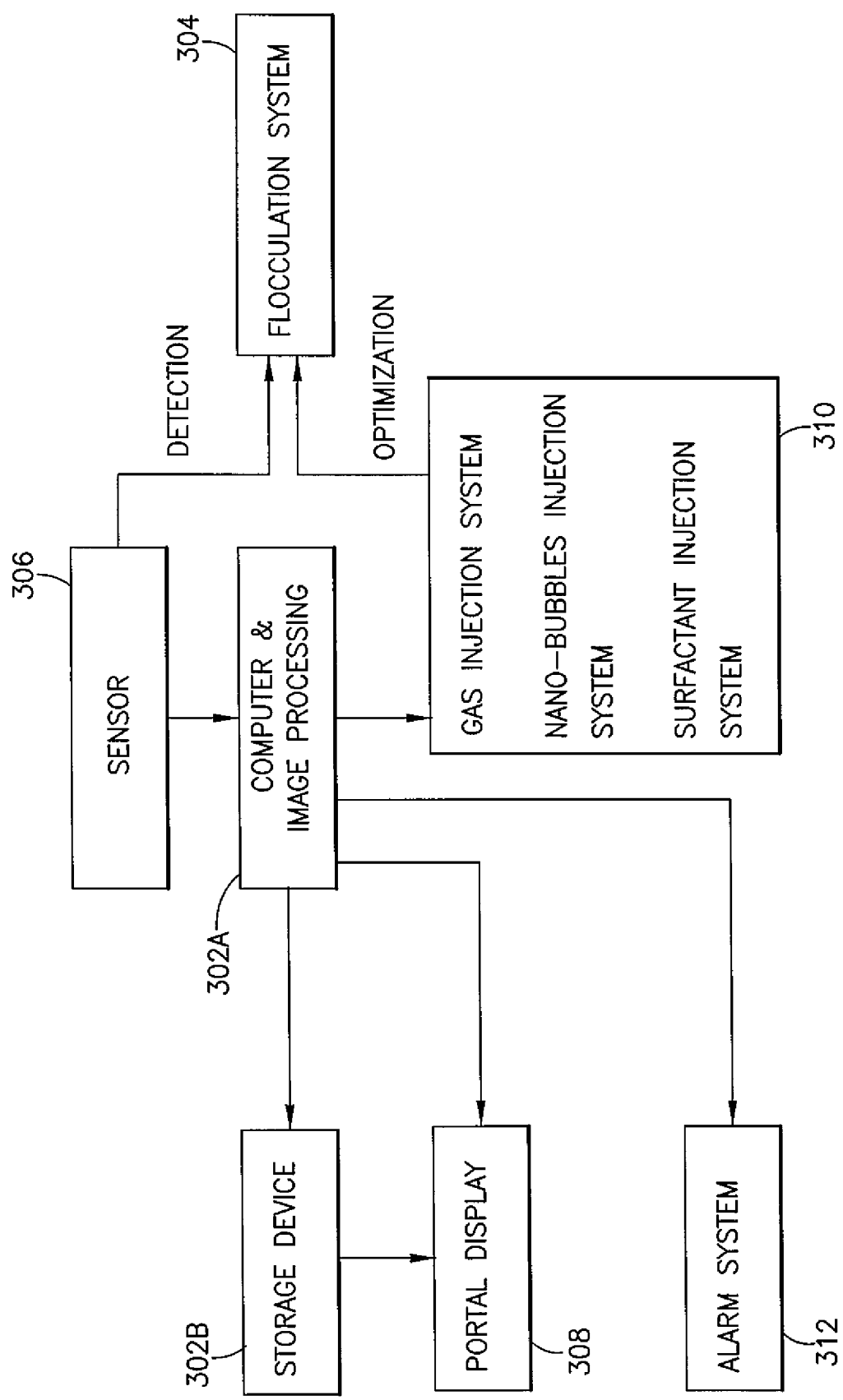
FIG. 3 is a high level block diagram showing a computing system for performing functions according to these teachings in association with a flocculation system and various subsystems including sensors, controls and alarms

These measurements and statistics, and particularly the contact angle values, may then be used to optimize the flocculation and/or flotation process, for example by more precisely metering the amount and/or type of surfactant introduced in the flocculation cell, and/or by adjusting the rate and/or size of nano-bubbles that the aerator injection system introduces to the liquid. FIG. 3 illustrates one example embodiment of a flocculation cell control system according to these teachings.

In the control system of FIG. 3 there is a computer 302A representing one or more processors, and a storage device 302B which may be internal of the computer 302A or separate as shown, or there may be multiple memories storing the implementing computer-readable code and results of the implementing image processing software. The computer 302A interfaces via one or more sensors 306 with the flocculation system 304, which has the flocculation cell(s) holding the fluid with entrained bubbles and particles that may form flocs as intended. The sensors 306 may be implemented as any of a variety of sensor types as are detailed above by non-limiting example. The computer 302A takes inputs from the sensor(s) 306 and provides outputs to a portal display 308 such as a graphical display interface/display panel. The data is image-processed in the computing device 302A/302B to identify parameters such as capillary nano/micro-bubble and floc size, distribution, volume and contact angles between the nano-bubbles and the fine particles in the floc. This information is used by one or more micro-controllers in the flocculation system's fluid additive control system 310 to optimize the amount/type of surfactant injected into the flotation cell, and/or the volume (rate) and size of bubbles injected there. To ensure that nano-bubbles do not collapse the gas injection system also controls the supra-saturation of the solution. The obtained information can be displayed on a visualization device 308 or stored in the memory 302B for later use.

In one embodiment the computer 302A automatically directs the control system 310 to make adjustments to implement the predicted optimization, and in another it outputs to the display 308 information about the predicted process improvement for implementation manually by a human operator. But these are not mutually exclusive; some suggested process improvements may be implemented automatically while others require manual intervention or an autonomous robotic system capable of performing the required task.

Additionally or alternatively, in one embodiment the described computer system 302A/302B can be used to detect faults in the gas injection system by providing notification to operators, such as for example via short-message-service SMS, or via email, automated phone call to a central operation unit, or sounding an alarm when conditions are detected beyond some pre-defined alarm threshold. This is indicated at FIG. 3 as the alarm system 312. The decision would be based on the real time data processing and anomaly detection regarding the gas nano/micro-bubble density and injection rate.

FIG. 4 is a logic flow diagram illustrating a method according to certain non-limiting embodiments of this invention. Block 402 may be completed by the one or more sensing systems 306 shown at FIG. 3 which is configured to reproduce one or more nano-bubbles with one or more particles suspended in a fluid. Block 404 of FIG. 4 may be completed by one or more processing systems 302A/302B of FIG. 3 which measure from the reproductions/images output from block 402 incident angles between the one or more nano-bubbles and the one or more particles suspended in the fluid. Finally at block 406 which may be completed by the fluid additive control system 310 of FIG. 3 upon a control command from the processing system 302A/302B, based on at least the incident angles there is adjusted an amount of a surfactant being added to the fluid.

Block 404B is an alternate additional step, the fluid additive control system 310 of FIG. 3 may also adjust characteristics of new nano-bubbles injected into the fluid based at least on the incident angles, size of the one or more nano-bubbles and size of the one or more particles. These sizes may also be measured by the processing system 302A/302B from the reproductions/images. For example, the characteristics of the new nano-bubbles injected into the fluid that may be adjusted include size of the new nano-bubbles and rate of new nano-bubble injection relative to volume of the fluid, and the characteristics are adjusted so as to optimize formation of flocs of multiple particles bound to one another via one or more capillary bridges defined by one or more of the new nano-bubbles.

In one particular implementation the fluid additive control system 310 of FIG. 3 is configured to select a type of the surfactant being added to the fluid, based on at least the incident angles. In various embodiments the association between the one or more nano-bubbles, the one or more particles, the incident angles, and the amount and type of the surfactant, which is created by the computer processing system 302A/302B of FIG. 3 when it does its characterization of the flocs, is stored in a computer readable memory such as the memory 302B shown at FIG. 3, and/or it may be used to drive a graphical display such as the portal display 308 of FIG. 3 so as to illustrate the one or more nano-bubbles, the one or more particles, and the incident angles therebetween, for different amounts of the surfactant being added to the fluid.

In a further example embodiment the processing system 302A/302B of FIG. 3 is further configured to determine, using the reproductions/images output from the sensing system 306, a number and distribution of capillary gas bridges throughout the fluid, wherein the capillary gas bridges are characterized by two or more of the particles attached to one another via one or more of the nano-bubbles so as to form a floc. An even more specific implementation has the fluid additive control system 310 adjusting the amount of the surfactant being added to the fluid a) so as to increase formation of capillary gas bridges between two or more of the particles that are attached to one another via one or more of the nano-bubbles, and also b) so as to decrease formation of flocs of two or more of the particles being held together by the surfactant in the absence of any nano-bubble.

As mentioned above, in a particularly accurate embodiment the processing system 302A/302B of FIG. 3 measures from the reproductions/images output from the sensor system 306, for a given pair of the particles connected to one another via a common one of the nano-bubbles, at least four gas-side contact angles that are measured in at least three perpendicular directions.

From the above it follows also that a flocculation control system according to these teachings also uses a prediction process to determine the volume of capillary bridges that are in contact with hydrophobic and/or hydrophilic surfaces of particles, that such a control system may also include an alarm system 312 characterized in that an alarm (which may be a text/email/phone notification if not urgent) is triggered when the amount of required gas, nano-bubbles or surfactant is not sufficient as compared to some pre-established efficiency threshold (e.g., if the median contact angle for flocs is less than 82 degrees, trigger the alarm/notification). These teachings can be integrated with a froth flotation separation system where there are a broad range of particle sizes to remove via flotation, for example by injecting larger bubbles (micro/millimeter size range) to bind with and float larger particles, and injecting nano-bubbles to flocculate the smaller size particles which then float as detailed herein, and skimming them all or separately depending on whether both large and small particle sizes are both waste/recyclable or not.

The present invention may be implemented as a system, a method, and/or a computer program product such as a computer readable memory having tangibly stored therewith computer readable program instructions which when executed cause a processor to carry out certain aspects of the present invention.

The computer readable storage medium such as the memory 302B can be a tangible device that can retain and store instructions for use by an instruction execution device (such as the data processor(s) of the computer 302A). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices and stored at a local computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent vulnerability types may be used by those skilled in the art. However, all such and similar modifications of the teachings of this invention will still fall within the scope of this invention.

What is claimed is:

1. A method, comprising:
    configuring at least one sensing system to reproduce one or more nano-bubbles with one or more particles suspended in a fluid;
    from reproductions of one or more nano-bubbles with one or more particles suspended in a fluid, measuring using at least one processing system incident angles between the one or more nano-bubbles and the one or more particles suspended in the fluid; and
    based on at least the incident angles, adjusting using at least one fluid additive control system an amount of a surfactant being added to the fluid.

2. The method of claim 1, further comprising configuring the at least one fluid additive control system to select a type of the surfactant being added to the fluid, based on at least the incident angles.

3. The method of claim 1, further comprising:
    storing in a computer readable memory an association between the one or more nano-bubbles, the one or more particles, the incident angles, and the amount and type of the surfactant; and
    driving a graphical display to illustrate the one or more nano-bubbles, the one or more particles, and the incident angles therebetween, for different amounts of the surfactant being added to the fluid by the at least one fluid additive control system.

4. The method according to claim 1, further comprising:
    determining, by the at least one processing system using the outputs of the at least one sensing system, number and distribution of capillary gas bridges throughout the fluid, wherein the capillary gas bridges are characterized by two or more of the particles attached to one another via one or more of the nano-bubbles.

5. The method according to claim 4, wherein the adjusting comprises configuring the at least one fluid additive control system to adjust the amount of the surfactant being added to the fluid:
    so as to increase formation of capillary gas bridges between two or more of the particles that are attached to one another via one or more of the nano-bubbles, and
    so as to decrease formation of flocs of two or more of the particles being held together by the surfactant in the absence of any nano-bubble.

6. The method according to claim 1, further comprising configuring the at least one processing system to measure, using the outputs of the at least one sensing system and for a given pair of the particles connected to one another via a common one of the nano-bubbles, at least four gas-side contact angles measured in at least three perpendicular directions.

7. The method according to claim 1, further comprising:
    adjusting, by configuring the at least one fluid additive control system, characteristics of new nano-bubbles injected into the fluid based at least on the measured incident angles, size of the one or more nano-bubbles and size of the one or more particles.

8. The method according to claim 7, wherein the characteristics of the new nano-bubbles injected into the fluid that are adjusted comprise size of the new nano-bubbles and rate of new nano-bubble injection relative to volume of the fluid, and the characteristics are adjusted so as to optimize formation of flocs of multiple particles bound to one another via one or more capillary bridges defined by one or more of the new nano-bubbles.

9. A non-transitory computer readable memory having tangibly stored therewith program code, the program code executable by a computing system to cause the computing system to perform actions comprising:
    configuring at least one sensing system to reproduce one or more nano-bubbles with one or more particles suspended in a fluid;
    from reproductions of one or more nano-bubbles with one or more particles suspended in a fluid, measuring using at least one processing system incident angles between the one or more nano-bubbles and the one or more particles suspended in the fluid; and
    based on at least the incident angles, adjusting using at least one fluid additive control system an amount of a surfactant being added to the fluid.

* * * * *